June 12, 1962 T. W. KAESTNER 3,038,284
PACKAGING APPARATUS
Filed Feb. 5, 1960 6 Sheets-Sheet 1

INVENTOR
THANKMAR W. KAESTNER
BY Pennie, Edmonds,
Morton, Barrows & Taylor
ATTORNEYS

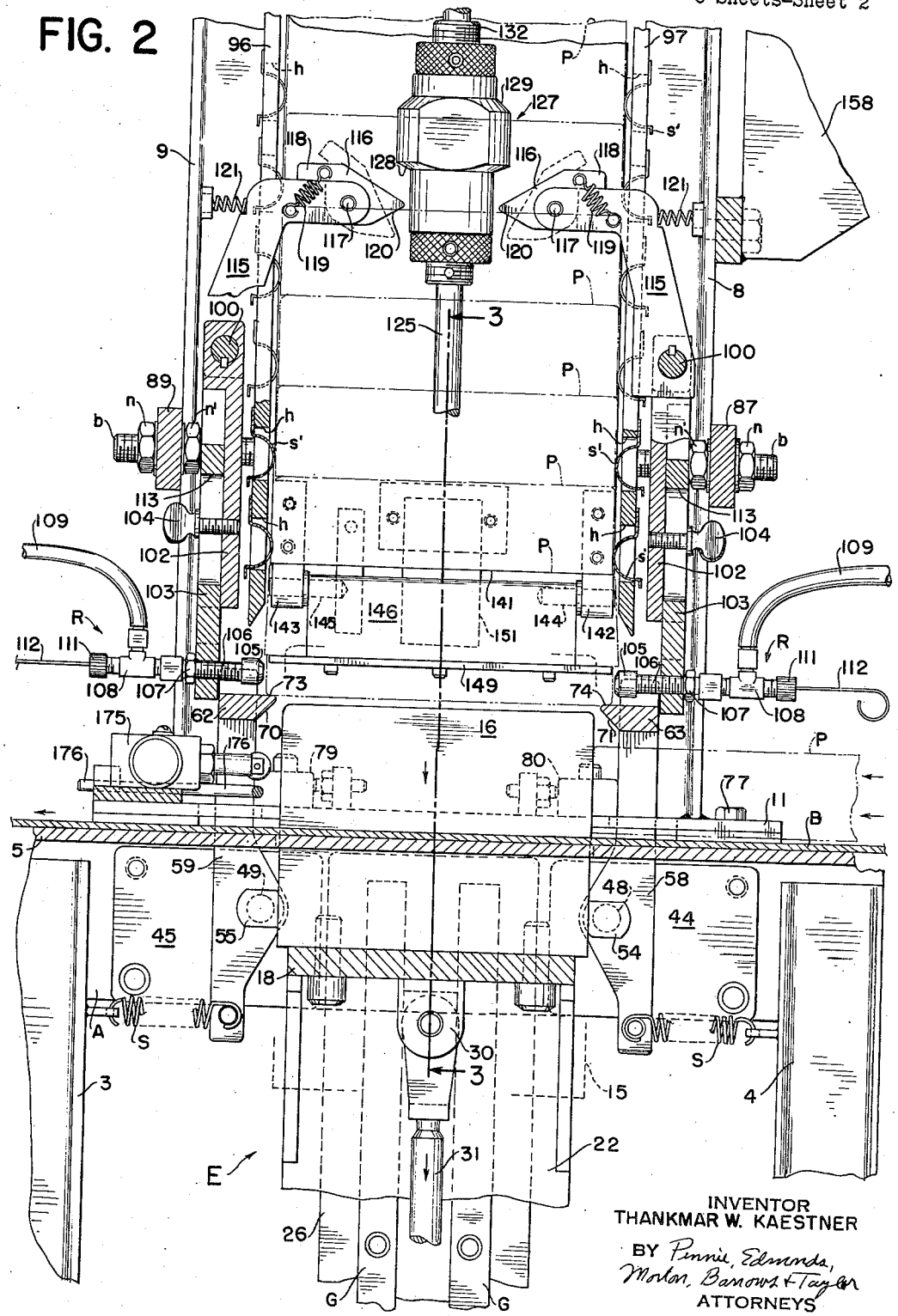

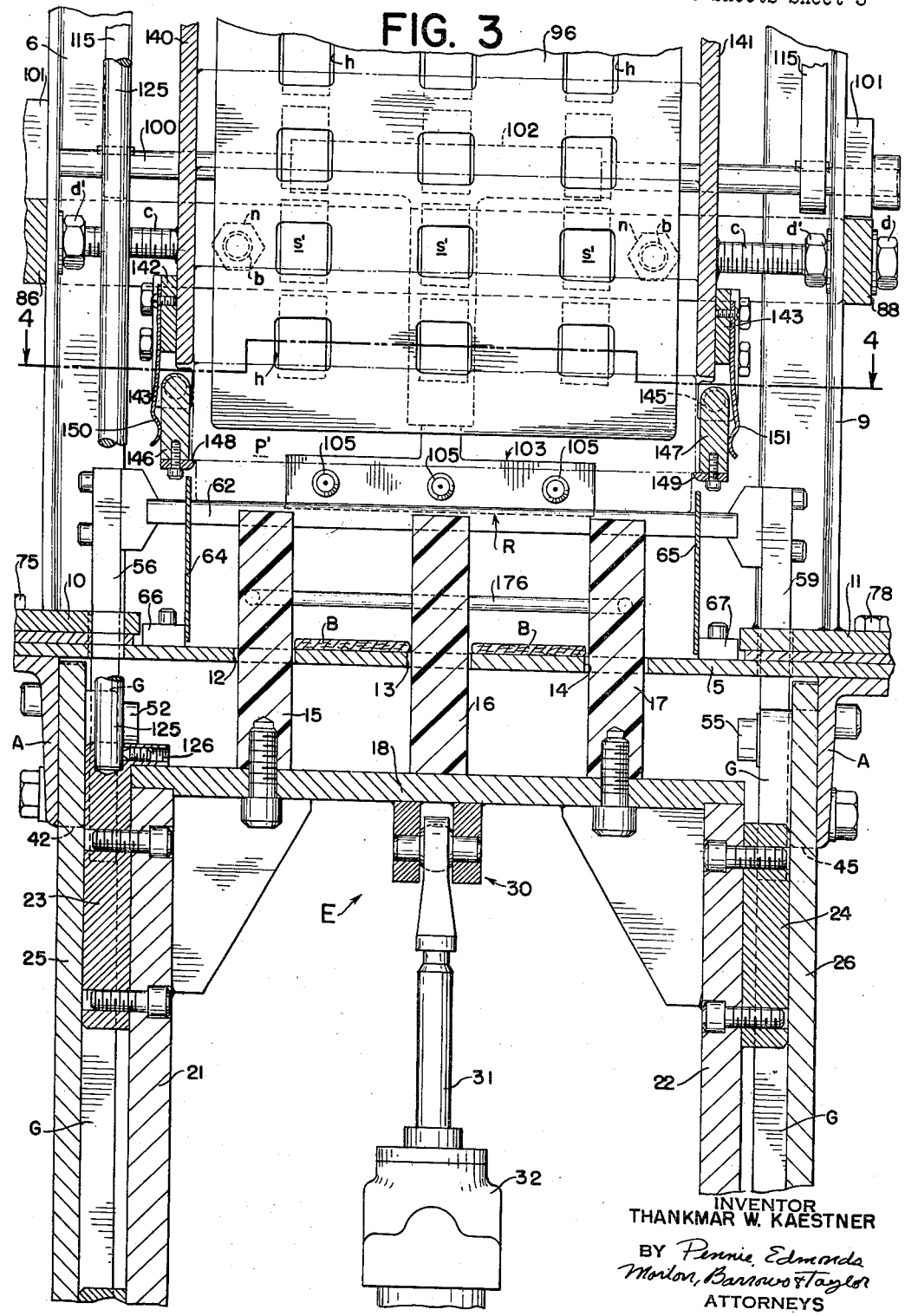

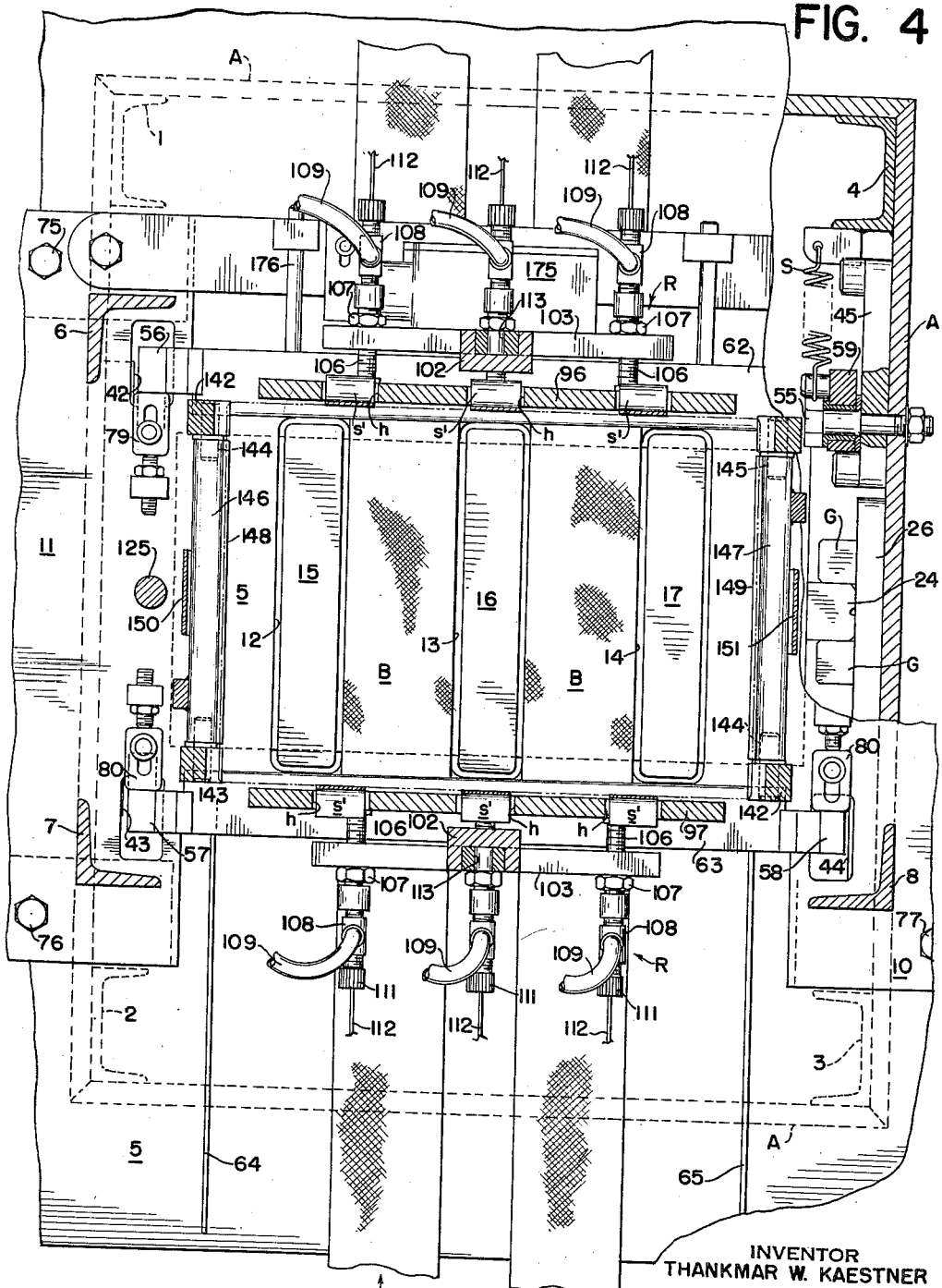

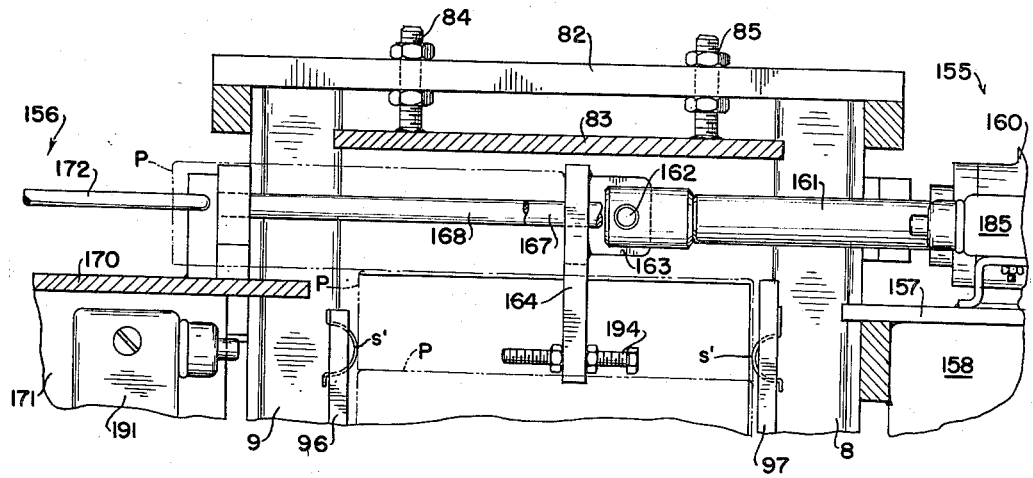

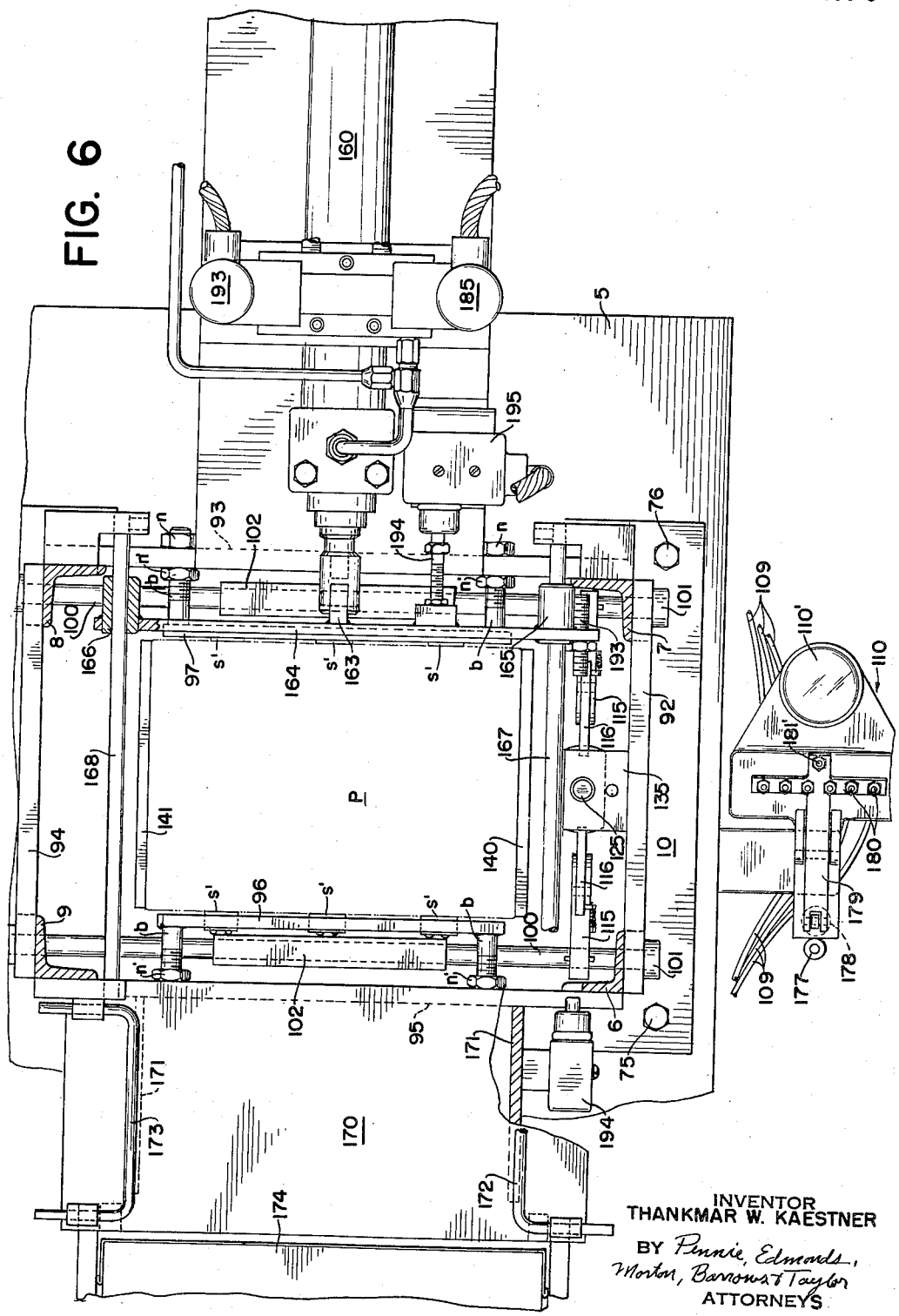

3,038,284
PACKAGING APPARATUS

Thankmar W. Kaestner, Bridgeport, Conn., assignor to Federal Paper Board Company, Inc., Bogota, N.J., a corporation of New York
Filed Feb. 5, 1960, Ser. No. 6,960
10 Claims. (Cl. 53—383)

This invention relates to the packaging of goods in small boxes or cartons, especially those which have a cover telescopically slidable over the receptacle of the carton, and has for its object the provision of an improved machine for gluing the cover to the receptacle. The invention is primarily concerned with apparatus for applying glue to the carton after the carton has been loaded with merchandise (hereinafter called a package) and the cover placed in position. Such packages usually pass along a conveyor to a shipping station, and it is an object of the invention to provide a machine which can be set in the conveyor to perform the gluing operation as the packages pass along. The apparatus of the invention may be used advantageously to interrupt the continuous passage of the packages to apply the glue and send them on their way along the conveyor.

The apparatus of the invention comprises means for receiving the packages one at a time, means for partly separating the receptacle and cover, applying glue to the receptacle, and then resetting the cover and conveying the glued cartons to a receiving system. The apparatus of the invention includes means for engaging and holding the cover, lowering the receptacle to expose the sides, applying glue to the exposed sides of the receptacle, forcing the receptacle and cover together, pressing the glued sides together and then removing the glued package from the apparatus.

One of the important features of the invention is that the operations of the invention are carried out in an upright movement of the packages and consequently the apparatus requires a very small area of floor space. The apparatus may be set into a conveyor which is conveying the packages to their shipping point to remove the cover sufficiently for the application of glue and then continue them as before.

The invention is primarily concerned with the gluing of packages loaded with merchandise, such as candy, which is sufficiently heavy that when the cover is held and the support on which the package rests is lowered, the receptacle will drop due to its own weight; however, the receptacle may be pulled down by vacuum cups.

These and other novel aspects of the invention will be better understood after considering the following discussion taken in conjunction with the accompanying drawings in which FIG. 1 is a side elevation of apparatus embodying the invention;

FIG. 2 is an enlarged fragmentary view similar to that of FIG. 1 with parts in section;

FIG. 3 is a sectional view at 3—3 of FIG. 2;

FIG. 4 is a sectional view at 4—4 of FIG. 3;

FIG. 5 is a sectional view of the upper part of the apparatus of FIG. 1; and

FIG. 6 is a plan view at 6—6 of FIG. 1.

Figure 1:
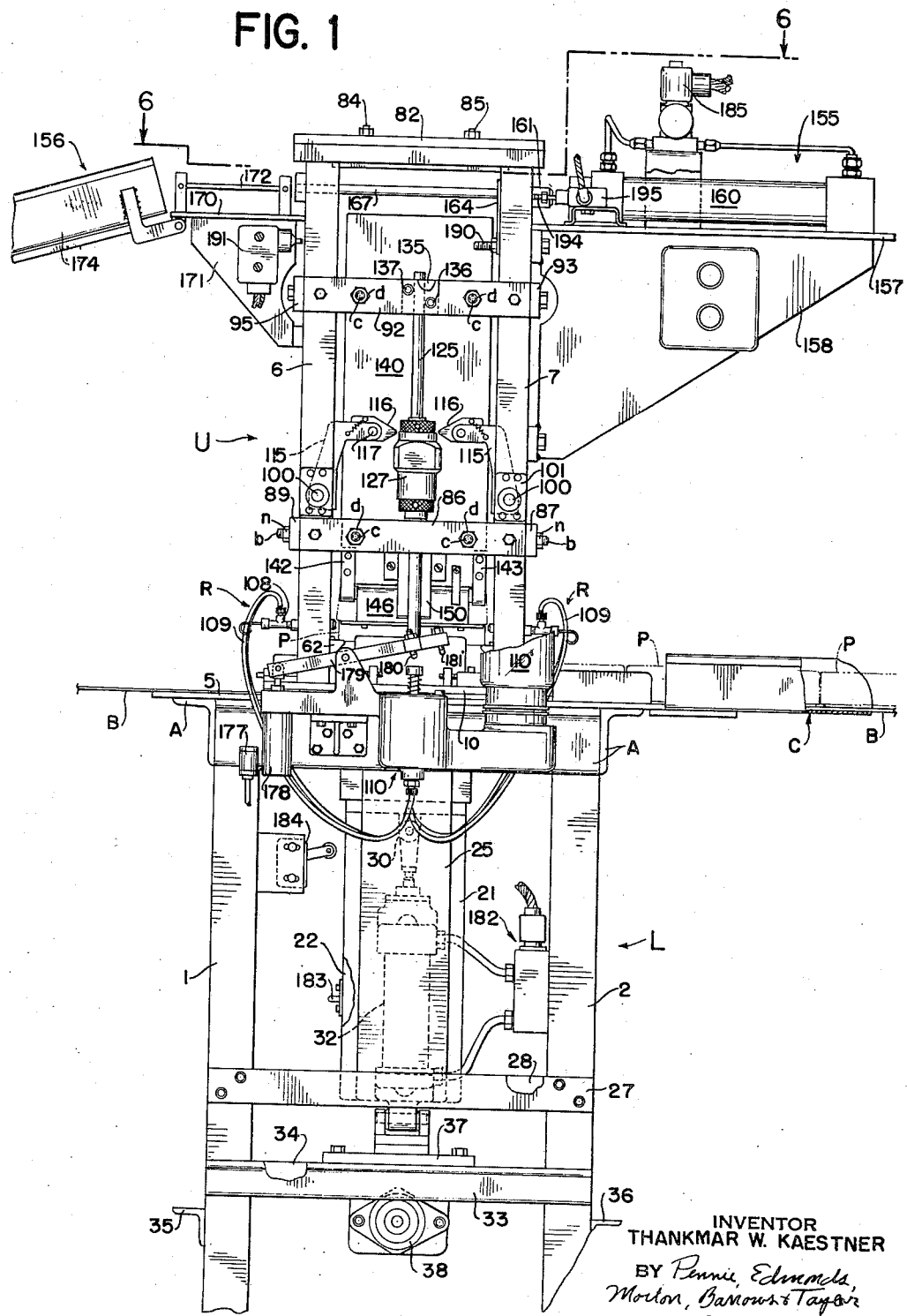

The apparatus illustrated comprises a lower portion L supported by four channel iron corner posts 1, 2, 3 and 4 on which is attached by means of angle bars A a base plate 5. This base plate supports an upper part U having four corner posts 6, 7, 8 and 9. The base plate 5 is in a horizontal position and extends to the right as seen in FIG. 1 to engage the conveyor C so that the conveyor belts B can carry the packages P to a position over the plate 5. Plate 5 supports top bars 10 and 11 on which the posts 6, 7, 8 and 9 are mounted and secured by welding.

The plate 5 has three rectangular slots 12, 13 and 14 (FIGS. 3 and 4) in which the lifting blocks 15, 16 and 17 of an elevator can move up and down to elevate the package which has moved into position and is supported on the belts B. These blocks are mounted on and secured to platform or elevator 18 which is secured to upright bars 21 and 22 each of which has attached upper bearing shoes or slides 23 and 24 which travel up and down in the space between the bearing guide bars G (FIGS. 3 and 4). A similar pair of bearing shoes (not shown) are provided at the bottom of the bars 21 and 22. Th guide bars G are attached to mounting plates 25 and 26 which are secured at their tops to angle bars A and at the bottom to bars 27 and 28.

The plate or platform 18 is attached through the wrist pin 30 to the rod 31 of the hydraulic or gas piston (not shown) in the cylinder 32 which moves platform 18 up and down.

The posts 1, 2, 3 and 4 are secured at the top by the angle bars A and at the lower posts by angle bars 33 and 34, and 35 and 36. The bars 33 and 34 support a platform 37 on which the cylinder 32 is mounted, and a roller 38 for the return of the belts B.

The four mounting blocks 42, 43, 44 and 45 are attached at the corners to the angle bars A and bearings 46, 47, 48 and 49 are mounted therein respectively on which are mounted pivot pins 52, 53, 54 and 55 for the levers 56, 57, 58 and 59. The levers 56 and 59 carry a horizontal bar 62 and the levers 57 and 58 carry a horizontal bar 63. These levers are biased at the bottom by springs S so that they normally pull the bars 62 and 63 inwardly towards each other as viewed in FIG. 2. The inward limit of movement of these bars 62 and 63 can be set by the adjustable stop blocks 79 and 80 (FIG. 2). These bars have under cam surfaces 70 and 71 for engaging a package P, and flat tops 73 and 74 for supporting a package thereon (shown in broken lines FIG. 2) as will be described hereinafter. The packages entering the machine on the belts B are guided at the sides by the plates 64 and 65 (FIG. 3) which are mounted on adjustable blocks 66 and 67 to accommodate packages of various widths.

The upper part U of the machine is removably secured to the lower part L by four corner screws 75, 76, 77 and 78. The four posts 6, 7, 8 and 9 provide an upright inner space or chamber for packages pushed upwardly by the elevator E which includes the platform 18 and attached blocks 15, 16 and 17, and are secured at the top by a cover 82 which carries a depending stop plate 83 adjustably supported by the screws 84 and 85 (FIGS. 1 and 5). At the lower portion of the posts there are four surrounding mounting bars 86, 87, 88 and 89 (FIGS. 1 and 2), and the upper part of the posts has four surrounding mounting bars 92, 93, 94 and 95 (FIGS. 1 and 6). Inside the four posts are two parallel upright package guide plates 96 and 97. Plate 96 has four bolts $b$ welded thereto which bolts pass through holes in the bars 89 and 95 and are secured by adjusting nuts $n$ and $n'$ by means of which the plate can be adjusted for packages of different sizes. Plate 97 also has four bolts $b$ welded thereto which pass through holes in bars 87 and 93 and are secured by adjusting nuts $n$ and $n'$ by means of which the plate can be adjusted for packages of different sizes. Each of the plates 96 and 97 has a plurality of holes $h$ in each of which is mounted a curved spring S' which is arranged to exert pressure on the cover of the glued package and hold it in position while the glue is setting as the packages P are pushed upwardly. The packages are accordingly held as they move upward by the plates 96 and 97 and by the springs S'.

There is on each of the two opposite sides of the upper part U and just above the plate 5 a glue applicator R each of which is of identical construction. Similar shafts 100 are mounted transversely between the posts 6, 9 and 7, 8 in suitable bearings 101. Keyed to each of these shafts is a depending bracket 102 to which is secured an upside-down T-shaped mounting plate 103. The plates 103 have elongated slots 113 by means of which they may be adjusted up or down and secured by the wing screws 104. As best shown in FIGS. 2, 3 and 4, the lower elongated part of plate 103 has three nozzles 105 of the glue applicators R, which are attached to a threaded pipe 106 in adjustable connection and secured by the lock nut 107. The pipe 106 connects to a T 108 which is connected to a hose 109 leading to a glue pump in the device 110. Each hose is connected to its own pump and glue is supplied to the pumps by gravity flow from the container 110'. One end of the T has a packing gland 111 through which projects a pin 112 which can be used as a valve by pushing it into the glue hole in the nozzle to regulate the amount of glue discharged on each cycle, and also to clean the nozzle. The nozzles 105 may be made of Teflon to minimize glue adherence. It will be seen with reference to FIG. 2 that the nozzles are arranged to be pushed against the sides of the inner or receptacle part of the package P and apply three dabs of glue on each side.

The shafts 100 each have keyed thereto levers 115 (FIGS. 1 and 2) with lateral upper extensions on which pawls 116 are pivoted by pins 117. These pawls have heels 118 which bear on the levers as shown in full lines to limit their upward turning and are held biased in this position by springs 119. The projecting ends of the pawls have cam surfaces 120. The levers are held inwardly to hold the glue nozzles 105 in the out-of-the-way positions shown in FIG. 2 by the coil springs 121 which bear on the posts 6 and 7.

With reference to FIG. 3, it will be seen that the rod 125 enters a hole in the slide 23 and is secured thereto by screw 126. The rod, accordingly, moves up and down with the platform 18 of the elevator E.

As best shown in FIGS. 1 and 2 rod 125 carries near its top an actuating head 127 which has a lower cam surface 128 and an upper cam surface 129. This head can be adjusted vertically on the threaded sleeve 132 which is secured to rod 125. As the rod moves up the surface 129 engages the surfaces 120 of the pawls and turns the shafts 100 and pushes the glue applicators R inwardly so that the nozzles 105 are in position to apply glue to the receptacle of the package. When the platform and head 127 move downward the tops of the pawls are engaged by the surface 128 and are pushed to the position shown in broken lines to allow the head to pass to its lowermost position. The upper part of rod 125 passes upward through a bearing 135 (FIG. 6) which is secured to bar 92 by bolts 136 and 137.

As best shown in FIGS. 1 and 3 the side plates 140 and 141 have screws c welded thereto which enter holes in bars 86 and 88, 92 and 94 and adjusting nuts d and d' which permit the plates to be moved in or out to adjust the space therebetween for packages of different sizes. As best shown in FIGS. 1 and 2, there is attached to the lower end of each side plate 140 and 141 brackets 142 and 143 carrying pivot pins 144 and 145 on which bars 146 and 147, respectively, are pivotally mounted. Each bar has at its lower end attached hooks 148 and 149 having rounded under projections to engage covers of the packages as shown in FIG. 3 and be pushed outwardly as the packages move upward. The bars 146 and 147 are urged inwardly to engage the covers by flat springs 150 and 151 which are secured to the side plates 140 and 141, respectively.

As shown in FIGS. 1, 5 and 6, the upper part of the machine comprises means for removing the glued packages including at one side a piston-operated package pushing means 155 and at the opposite side a package receiving means 156. The package pushing means comprises a table 157 attached to the sides of the posts 7 and 8 and held rigid by the gusset 158. The piston (not shown) of the fluid cylinder 160 is mounted on the table 157 and has a rod 161 connected by the pin 162 to the block 163 of the pusher bar 164. As shown in FIG. 6 this pusher bar has bearing bushings 165 and 166 on each end which guide it in its reciprocal motion on rods 167 and 168. The piston of the cylinder 160 may be operated in both directions by fluid or in one direction by fluid and returned by a spring.

The package receiving means 156 comprises a table 170 secured to posts 6 and 9 and held rigid by gusset 171. Side brackets or rails 172 and 173 are attached to the table to guide the packages across the table 170. These rails are adjustable for packages of different sizes. The table is attached to a conveyor or chute 174 which receives the packages.

The apparatus of the invention is operated to glue the covers of rectangular packages (cartons loaded with merchandise) to the receptacle portions thereof as follows. In the starting position the compression chamber, which is between the side plates 96, 97 and 140, 141, is filled with packages, and the cover is held by the lugs 148 and 149 as in FIG. 3 while the receptacle is resting on the package below. The packages P are continuously pushed towards the left as in FIG. 1 on the belts B. The leading package strikes the microswitch 175 (FIG. 2) and after moving an additional fraction of an inch strikes the stop bar 176 which stops this package and also stops the other packages on the conveyor. (The microswitch 175 and stop 176 may be mounted on pivots to be swung out of the way so that the production line is not held up if any maintenance work is necessary.) This switch is connected to solenoid valve 177 which admits fluid to the piston of the cylinder 178 and the lever 179 is raised causing the bar 180 to strike the plungers 181 of the glue pumps and force a dab of glue on the ends of the nozzles 105. The screw 181' can be adjusted to limit the length of the strokes of the glue pumps. The microswitch 175 is also electrically connected to the solenoid valve 187 which opens and admits liquid to the cylinder 32 and the piston thereof pushes the blocks 15, 16 and 17 on platform 18 (the elevator) against the bottom of the package on the conveyor and pushes it upward. As the elevator moves upward, the glue nozzles apply three dabs of glue to the two opposite sides of the receptacle as will be described later. As each package moves upward it engages the inclined surfaces 70 and 71 of the bars 62 and 63 and pushes them outwardly, and when the package passes above these bars the springs S push them under the bottom edges of the package as shown in FIG. 2. However, the piston continues to raise the package to the position shown in broken lines in FIG. 2, at which time the blades 148 and 149 are snapped under the lower edges of the cover by the action of springs 150 and 151. During this movement, all the packages are pushed upward so that the uppermost package is in front of the pusher 164 on the piston of cylinder 160 (FIG. 6). When the contact lug 153 on the upright bar 22 strikes the microswitch 184 (FIG. 1) which is electrically connected to the solenoid valve 185, the fluid in cylinder 32 is released and the piston drops and this causes the loaded receptacle of the package to drop with it until it is caught by the bars 62 and 63 (FIG. 2) but the cover is caught by the edges of the blades 148 and 149 (FIG. 3) and held thereabove, thereby exposing a considerable area of the opposite sides of the receptacle directly opposite the glue nozzles 105. Vacuum cups may be attached to blocks 15, 16 and 17 to pull the receptacle downward.

When the blocks 15, 16 and 17 of the elevator E reach the bottom of their stroke, below the belts B, another package moves into position until it strikes the microswitch 175 and rail stop 176. This causes the piston of cylinder 32 to again raise the elevator and push another package upward in a repetition of the operation. While this package is being pushed upward the cam surface 129 of the head 127 on the rod 125 engages the inclined surfaces 120 of the pawls 116 and pushes the arms 115 outwardly compressing the springs 121 and turning the bars 103 and nozzles 105 inward into position to apply the six dabs of glue to the exposed opposite sides of the receptacle of the package. Then as the piston continues upward the package on the blocks 15, 16 and 17 strikes the bottom of the package just glued and forces the bottom into the cover. As this operation is repeated there is a series of glued packages stacked one over the other moved upward in increments. As the packages move upward the glued sides of the cover are engaged by the springs S' and are held in position until the glue has set. After the head 127 passes upward beyond the pawls 116, the springs 121 turn the glue nozzles 105 outward out of contact with the package. The switch 184 is electrically connected to the solenoid valve 185 which controls the admission of fluid to cylinder 160 and the pusher 164 is advanced towards the left as in FIG. 5 to push the uppermost package onto the table 170 as in FIG. 1. At the end of its stroke the contact screw 190 on the pusher 164 strikes the microswitch 191 which is electrically connected to the solenoid valve 193. The piston of cylinder 160 is retracted to the right to the position of FIG. 6. At this position the pin 194 on the pusher 164 contacts the microswitch 195 which interlocks with the valve 182 of cylinder 32 which is necessary to avoid the advance of the elevator E prior to the time the pusher 164 is in its retracted position.

It will, of course, be understood that the pistons of cylinders 32, 160 and 178 may be operated in both directions by fluid pressure such as water or air or that they may be operated in only one direction by fluid and in the opposite direction by a return spring. Suitable manual switches can be provided to start and stop the machine.

I claim:

1. Apparatus for gluing the cover of a package to the receptacle thereof which comprises means for placing the packages one-at-a-time on an elevator, means for pushing the elevator and the package upward and then lowering the elevator and package a predetermined distance, a catch means for engaging and holding the cover as the receptacle is being lowered to its gluing position, a second catch means for engaging the receptacle and holding it a spaced distance below the cover sufficiently to expose areas of the sides, a glue applicator positioned to apply glue to the exposed areas of the sides, means for operating the glue applicator in timed relation to movement of the elevator, and means for pushing the receptacle into the cover after the application of glue.

2. Apparatus according to claim 1 which comprises means for receiving a series of glued packages, one stacked over the other, whereby the last carton pushed upward pushes the other cartons upward with it, and means operated in timed relation to the elevator to remove the uppermost package from the stack.

3. Apparatus according to claim 1 which comprises a compression chamber through which each package is pushed upward and the glued sides are held to the receptacle until the glue has set.

4. Apparatus according to claim 1, which comprises means for receiving a series of packages, one stacked over the other above the elevator, when the lowermost package (one on the elevator) is pushed upward it engages the receptacle of the package to which glue just has been applied and pushes it under its cover, a repetition of the operation pushes the series of packages upward, and resilient means for holding the cover sides against the glue as the packages move upward.

5. Apparatus for gluing the cover of a package to the receptacle which comprises a compression chamber for holding a series of packages stacked over each other, means for receiving the packages one-at-a-time at the bottom of said chamber, a fluid operated elevator for engaging each package as it is received and pushing it upward a predetermined distance, means for moving the elevator downward from the end of the upward stroke, the receptacle of the package moving downward with the elevator, means for automatically engaging the cover of the receptacle and holding it as the receptacle falls with the elevator, automatic means for engaging and holding the receptacle while partly in the cover as the elevator continues to move downward, means in operative connection with the elevator to apply glue to the exposed opposite sides of the receptacle, on the return stroke of the elevator the package thereon strikes the receptacle to which the last glue has been applied and pushes it into its cover, whereby each package pushed upward pushes all the packages thereabove upward, and means for removing the uppermost package of the stack when it comes into position.

6. Apparatus according to claim 5 which comprises a glue applicator which is moved into gluing position by the elevator, and means operated in timed relation with the elevator to apply glue on the applicator against the receptacle.

7. Apparatus according to claim 5 which comprises spring pressed hooks which engage and hold the cover, and spring pressed hooks which engage the receptacle, each of said hooks having sloping surfaces which engage the receptacle as it is pushed upward, whereby they spring to out-of-the-way positions as the packages move upward.

8. Apparatus according to claim 5 which comprises means operated in timed relation to the movement of the elevator to push the uppermost package from the stack.

9. Apparatus according to claim 5 which comprises fluid operated means for operating the elevator and for pushing the top package from the stack.

10. Apparatus for applying glue to a package consisting of a receptacle and a cover to secure the cover to the receptacle which comprises means for moving a succession of packages with the covers on the receptacles upward in a chamber, mechanically operated means for partly separating the cover from the receptacle of each package while in the chamber to expose sides of the receptacle, mechanical means for momentarily stopping the upward movement of the packages and holding the receptacle and cover in their separated positions, means for applying glue to at least one exposed side of the receptacle, means for pushing the receptacle and cover together after the application of glue, and means for holding the cover and receptacle together until the glue has set.

References Cited in the file of this patent

UNITED STATES PATENTS 2,939,258    Anness ----------------- June 7, 1960

FOREIGN PATENTS 581,469    Great Britain ---------- Oct. 14, 1946